(12) United States Patent
Kamiyamaguchi

(10) Patent No.: US 12,139,153 B2
(45) Date of Patent: Nov. 12, 2024

(54) FAILURE SYMPTOM SENSING SYSTEM, VEHICLE, FAILURE SYMPTOM SENSING METHOD, AND COMPUTER-READABLE RECORDING MEDIUM

(71) Applicant: HONDA MOTOR CO.,LTD., Tokyo (JP)

(72) Inventor: Tsutomu Kamiyamaguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 304 days.

(21) Appl. No.: 17/680,311

(22) Filed: Feb. 25, 2022

(65) Prior Publication Data

US 2022/0289216 A1    Sep. 15, 2022

(30) Foreign Application Priority Data

Mar. 9, 2021   (JP) .................... 2021-037219

(51) Int. Cl.
*B60W 50/035* (2012.01)
*B60W 50/02* (2012.01)
(Continued)

(52) U.S. Cl.
CPC ...... *B60W 50/035* (2013.01); *B60W 50/0205* (2013.01); *G07C 5/02* (2013.01); *G07C 5/085* (2013.01)

(58) Field of Classification Search
CPC ................. B60W 30/12; B60W 50/00; B60W 2050/0056; B60W 2510/20; B60W 2710/207; B60R 16/02; G05B 23/02
(Continued)

(56) References Cited

U.S. PATENT DOCUMENTS 9,883,258 B2 *   1/2018  Yun ...................... H04Q 9/00
10,459,760 B2 *  10/2019 Scheuer ............... G06F 9/4881
(Continued)

FOREIGN PATENT DOCUMENTS

JP    2009146086 A    7/2009
JP    2012172615 A    9/2012
(Continued)

OTHER PUBLICATIONS

Office Action issued for counterpart Japanese Application No. 2021-037219, issued by the Japanese Patent Office on Mar. 22, 2023 (drafted on Mar. 13, 2023).
(Continued)

*Primary Examiner* — Andrew Joseph Rudy

(57) ABSTRACT

A failure symptom sensing system may comprise an acquisition unit configured to acquire, while a driving function of a vehicle is in operation, a plurality of data from a plurality of sensors configured to sense a state of the vehicle. The failure symptom sensing system may comprise a generation unit configured to generate, from the plurality of data, feature quantity data indicating a feature quantity of each of the plurality of data in accordance with a predetermined algorithm. The failure symptom sensing system may comprise a sensing unit configured to sense, when the sensing unit senses an instruction to stop the driving function of the vehicle, whether an indication of failure of the vehicle exists based on the feature quantity data and a predetermined reference feature quantity data.

20 Claims, 17 Drawing Sheets

(51) Int. Cl.
*G07C 5/02* (2006.01)
*G07C 5/08* (2006.01)
(58) Field of Classification Search
USPC .......................................................... 701/26
See application file for complete search history.

(56) References Cited

U.S. PATENT DOCUMENTS

| | | | |
|---|---|---|---|
| 11,068,958 B1* | 7/2021 | Rackley, III | G06Q 30/0645 |
| 11,682,246 B2* | 6/2023 | Park | G07C 5/0808 |
| | | | 701/33.2 |
| 11,774,974 B2* | 10/2023 | Wei | B60W 50/038 |
| | | | 701/23 |
| 2002/0029136 A1* | 3/2002 | Hagiwara | G01M 13/02 |
| | | | 703/8 |
| 2016/0266886 A1* | 9/2016 | Sarkar | H04W 4/50 |
| 2019/0146508 A1* | 5/2019 | Dean | G05D 1/0274 |
| | | | 701/26 |
| 2020/0276979 A1 | 9/2020 | Ogura | |
| 2021/0053581 A1* | 2/2021 | Ewert | B60W 50/06 |
| 2022/0091590 A1 | 3/2022 | Hanada | |
| 2022/0166632 A1* | 5/2022 | Lee | H04L 9/3242 |
| 2023/0242160 A1* | 8/2023 | Sen | G05D 1/0088 |
| | | | 701/26 |
| 2023/0415744 A1* | 12/2023 | Clarke | B60W 30/08 |

FOREIGN PATENT DOCUMENTS

| | | |
|---|---|---|
| JP | 2020082993 A | 6/2020 |
| JP | 2020140436 A | 9/2020 |
| JP | 2020154896 A | 9/2020 |

OTHER PUBLICATIONS

Office Action issued for counterpart Japanese Application No. 2021-037219, issued by the Japanese Patent Office on Jun. 13, 2023 (drafted on Jun. 6, 2023).

Office Action issued for counterpart Japanese Application No. 2021-037219, issued by the Japanese Patent Office on Dec. 13, 2022 (drafted on Dec. 5, 2022).

* cited by examiner

| TIME (sec) | R(rpm) | V(km/h) | T(°C) |
|---|---|---|---|
| 0.0 | 1,461 | 32 | 78 |
| 0.2 | 1,437 | 37 | 78 |
| 0.4 | 1,383 | 36 | 78 |
| 0.6 | 1,353 | 33 | 79 |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |
| ... | ... | ... | ... |

*FIG.3*

| TIME (sec) | R (rpm) | | | V (km/h) | | | T (°C) | | | |
|---|---|---|---|---|---|---|---|---|---|---|
| | $R_{av}$ | $R_{mx}$ | $R_{mn}$ | $R_{in}$ | $V_{av}$ | $V_{mx}$ | $V_{mn}$ | $V_{in}$ | $T_{av}$ | $T_{mx}$ | $T_{mn}$ | $T_{in}$ |
| 0 SEC - 3 SECS | $R_{av-1}$ | $R_{mx-1}$ | $R_{mn-1}$ | $R_{in-1}$ | $V_{av-1}$ | $V_{mx-1}$ | $V_{mn-1}$ | $V_{in-1}$ | $T_{av-1}$ | $T_{mx-1}$ | $T_{mn-1}$ | $T_{in-1}$ |
| 3 SECS - 6 SECS | $R_{av-2}$ | $R_{mx-2}$ | $R_{mn-2}$ | $R_{in-2}$ | $V_{av-2}$ | $V_{mx-2}$ | $V_{mn-2}$ | $V_{in-2}$ | $T_{av-2}$ | $T_{mx-2}$ | $T_{mn-2}$ | $T_{in-2}$ |
| 6 SECS - 9 SECS | $R_{av-3}$ | $R_{mx-3}$ | $R_{mn-3}$ | $R_{in-3}$ | $V_{av-3}$ | $V_{mx-3}$ | $V_{mn-3}$ | $V_{in-3}$ | $T_{av-3}$ | $T_{mx-3}$ | $T_{mn-3}$ | $T_{in-3}$ |
| 9 SECS - 12 SECS | $R_{av-4}$ | $R_{mx-4}$ | $R_{mn-4}$ | $R_{in-4}$ | $V_{av-4}$ | $V_{mx-4}$ | $V_{mn-4}$ | $V_{in-4}$ | $T_{av-4}$ | $T_{mx-4}$ | $T_{mn-4}$ | $T_{in-4}$ |
| 12 SECS - 15 SECS | $R_{av-5}$ | $R_{mx-5}$ | $R_{mn-5}$ | $R_{in-5}$ | $V_{av-5}$ | $V_{mx-5}$ | $V_{mn-5}$ | $V_{in-5}$ | $T_{av-5}$ | $T_{mx-5}$ | $T_{mn-5}$ | $T_{in-5}$ |
| ... | ... | ... | ... | ... | ... | ... | ... | ... | ... | ... | ... | ... |

*FIG.4*

PRIMARY CLUSTER Dj

| | | CORE VECTORS → RANDOMLY PLACED | | | | | | | | | | | | |
|---|---|---|---|---|---|---|---|---|---|---|---|---|---|---|
| | | | ROTATION SPEED | | | | VEHICLE SPEED | | | | TEMPERATURE | | | |
| CORE VECTOR 1 | D1 | | Rav-c1 | Rmx-c1 | Rmn-c1 | Rin-c1 | Vav-c1 | Vmx-c1 | Vmn-c1 | Vin-c1 | Tav-c1 | Tmx-c1 | Tmn-c1 | Tin-c1 |
| CORE VECTOR 2 | D2 | | Rav-c2 | Rmx-c2 | Rmn-c2 | Rin-c2 | Vav-c2 | Vmx-c2 | Vmn-c2 | Vin-c2 | Tav-c2 | Tmx-c2 | Tmn-c2 | Tin-c2 |
| CORE VECTOR 3 | D3 | | Rav-c3 | Rmx-c3 | Rmn-c3 | Rin-c3 | Vav-c3 | Vmx-c3 | Vmn-c3 | Vin-c3 | Tav-c3 | Tmx-c3 | Tmn-c3 | Tin-c3 |
| CORE VECTOR 4 | D4 | | Rav-c4 | Rmx-c4 | Rmn-c4 | Rin-c4 | Vav-c4 | Vmx-c4 | Vmn-c4 | Vin-c4 | Tav-c4 | Tmx-c4 | Tmn-c4 | Tin-c4 |
| CORE VECTOR 5 | D5 | | Rav-c5 | Rmx-c5 | Rmn-c5 | Rin-c5 | Vav-c5 | Vmx-c5 | Vmn-c5 | Vin-c5 | Tav-c5 | Tmx-c5 | Tmn-c5 | Tin-c5 |
| CORE VECTOR 6 | D6 | | Rav-c6 | Rmx-c6 | Rmn-c6 | Rin-c6 | Vav-c6 | Vmx-c6 | Vmn-c6 | Vin-c6 | Tav-c6 | Tmx-c6 | Tmn-c6 | Tin-c6 |
| CORE VECTOR 7 | D7 | | Rav-c7 | Rmx-c7 | Rmn-c7 | Rin-c7 | Vav-c7 | Vmx-c7 | Vmn-c7 | Vin-c7 | Tav-c7 | Tmx-c7 | Tmn-c7 | Tin-c7 |
| CORE VECTOR 8 | D8 | | Rav-c8 | Rmx-c8 | Rmn-c8 | Rin-c8 | Vav-c8 | Vmx-c8 | Vmn-c8 | Vin-c8 | Tav-c8 | Tmx-c8 | Tmn-c8 | Tin-c8 |
| CORE VECTOR 9 | D9 | | Rav-c9 | Rmx-c9 | Rmn-c9 | Rin-c9 | Vav-c9 | Vmx-c9 | Vmn-c9 | Vin-c9 | Tav-c9 | Tmx-c9 | Tmn-c9 | Tin-c9 |
| CORE VECTOR 10 | D10 | | Rav-c10 | Rmx-c10 | Rmn-c10 | Rin-c10 | Vav-c10 | Vmx-c10 | Vmn-c10 | Vin-c10 | Tav-c10 | Tmx-c10 | Tmn-c10 | Tin-c10 |
| CORE VECTOR 11 | D11 | | Rav-c11 | Rmx-c11 | Rmn-c11 | Rin-c11 | Vav-c11 | Vmx-c11 | Vmn-c11 | Vin-c11 | Tav-c11 | Tmx-c11 | Tmn-c11 | Tin-c11 |
| CORE VECTOR 12 | D12 | | Rav-c12 | Rmx-c12 | Rmn-c12 | Rin-c12 | Vav-c12 | Vmx-c12 | Vmn-c12 | Vin-c12 | Tav-c12 | Tmx-c12 | Tmn-c12 | Tin-c12 |
| CORE VECTOR 13 | D13 | | Rav-c13 | Rmx-c13 | Rmn-c13 | Rin-c13 | Vav-c13 | Vmx-c13 | Vmn-c13 | Vin-c13 | Tav-c13 | Tmx-c13 | Tmn-c13 | Tin-c13 |
| CORE VECTOR 14 | D14 | | Rav-c14 | Rmx-c14 | Rmn-c14 | Rin-c14 | Vav-c14 | Vmx-c14 | Vmn-c14 | Vin-c14 | Tav-c14 | Tmx-c14 | Tmn-c14 | Tin-c14 |
| CORE VECTOR 15 | D15 | | Rav-c15 | Rmx-c15 | Rmn-c15 | Rin-c15 | Vav-c15 | Vmx-c15 | Vmn-c15 | Vin-c15 | Tav-c15 | Tmx-c15 | Tmn-c15 | Tin-c15 |
| CORE VECTOR 16 | D16 | | Rav-c16 | Rmx-c16 | Rmn-c16 | Rin-c16 | Vav-c16 | Vmx-c16 | Vmn-c16 | Vin-c16 | Tav-c16 | Tmx-c16 | Tmn-c16 | Tin-c16 |
| CORE VECTOR 17 | D17 | | Rav-c17 | Rmx-c17 | Rmn-c17 | Rin-c17 | Vav-c17 | Vmx-c17 | Vmn-c17 | Vin-c17 | Tav-c17 | Tmx-c17 | Tmn-c17 | Tin-c17 |
| CORE VECTOR 18 | D18 | | Rav-c18 | Rmx-c18 | Rmn-c18 | Rin-c18 | Vav-c18 | Vmx-c18 | Vmn-c18 | Vin-c18 | Tav-c18 | Tmx-c18 | Tmn-c18 | Tin-c18 |
| CORE VECTOR 19 | D19 | | Rav-c19 | Rmx-c19 | Rmn-c19 | Rin-c19 | Vav-c19 | Vmx-c19 | Vmn-c19 | Vin-c19 | Tav-c19 | Tmx-c19 | Tmn-c19 | Tin-c19 |
| CORE VECTOR 20 | D20 | | Rav-c20 | Rmx-c20 | Rmn-c20 | Rin-c20 | Vav-c20 | Vmx-c20 | Vmn-c20 | Vin-c20 | Tav-c20 | Tmx-c20 | Tmn-c20 | Tin-c20 |

FIG.5

| RANGE OF VALUES OF COLUMN | COUNTED NUMBERS |
|---|---|
| 0.0 – 0.1 | 22 |
| 0.1 – 0.2 | 0 |
| 0.2 – 0.3 | 0 |
| 0.3 – 0.4 | 18 |
| 0.4 – 0.5 | 30 |
| 0.5 – 0.6 | 14 |
| 0.6 – 0.7 | 2 |
| 0.7 – 0.8 | 0 |
| 0.8 – 0.9 | 9 |
| 0.9 – 1.0 | 5 |

*FIG.7A*

| RANGE OF VALUES OF COLUMN | COUNTED NUMBERS |
|---|---|
| 0.0 – 0.1 | 22 |
| 0.3 – 0.4 | 18 |
| 0.4 – 0.5 | 30 |
| 0.5 – 0.6 | 14 |
| 0.6 – 0.7 | 2 |
| 0.8 – 0.9 | 9 |
| 0.9 – 1.0 | 5 |

*FIG.7B*

| GROUP ID | RANGE OF VALUES OF COLUMN | COUNTED NUMBERS |
|---|---|---|
| 1 | 0.0 – 0.1 | 22 |
| 2 | 0.3 – 0.7 | 64 |
| 3 | 0.8 – 1.0 | 14 |

*FIG.7C*

| GROUP ID | RANGE OF VALUES OF COLUMN | COUNTED NUMBERS |
|---|---|---|
| 1 | 0.0 – 0.1 | 22 |
| 2 | 0.3 – 0.7 | 64 |

*FIG.7D*

FAILURE SYMPTOM SENSING SYSTEM, VEHICLE, FAILURE SYMPTOM SENSING METHOD, AND COMPUTER-READABLE RECORDING MEDIUM

The contents of the following Japanese patent application are incorporated herein by reference:
NO. 2021-037219 filed in JP on Mar. 9, 2021.

BACKGROUND

1. Technical Field

The present invention relates to a failure symptom sensing system, a vehicle, a failure symptom sensing method, and a computer-readable recording medium.

2. Related Art

Patent document 1 describes a failure symptom sensing system for sensing a symptom of failure wherein the object is a manufacturing apparatus for performing manufacturing operations consisting of a plurality of operations.

PRIOR ART DOCUMENT

Patent Document

Patent document 1: Japanese Patent Application Publication No. 2020-154896

BRIEF DESCRIPTION OF THE DRAWINGS

FIG. 3 illustrates one example of data acquired from a sensor.
FIG. 4 illustrates one example of numeric vectors.
FIG. 5 illustrates one example of core vectors.
FIG. 7A describes the procedure to set the range of reference values.
FIG. 7B describes the procedure to set the range of reference values.
FIG. 7C describes the procedure to set the range of reference values.
FIG. 7D describes the procedure to set the range of reference values.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

Figure 1:
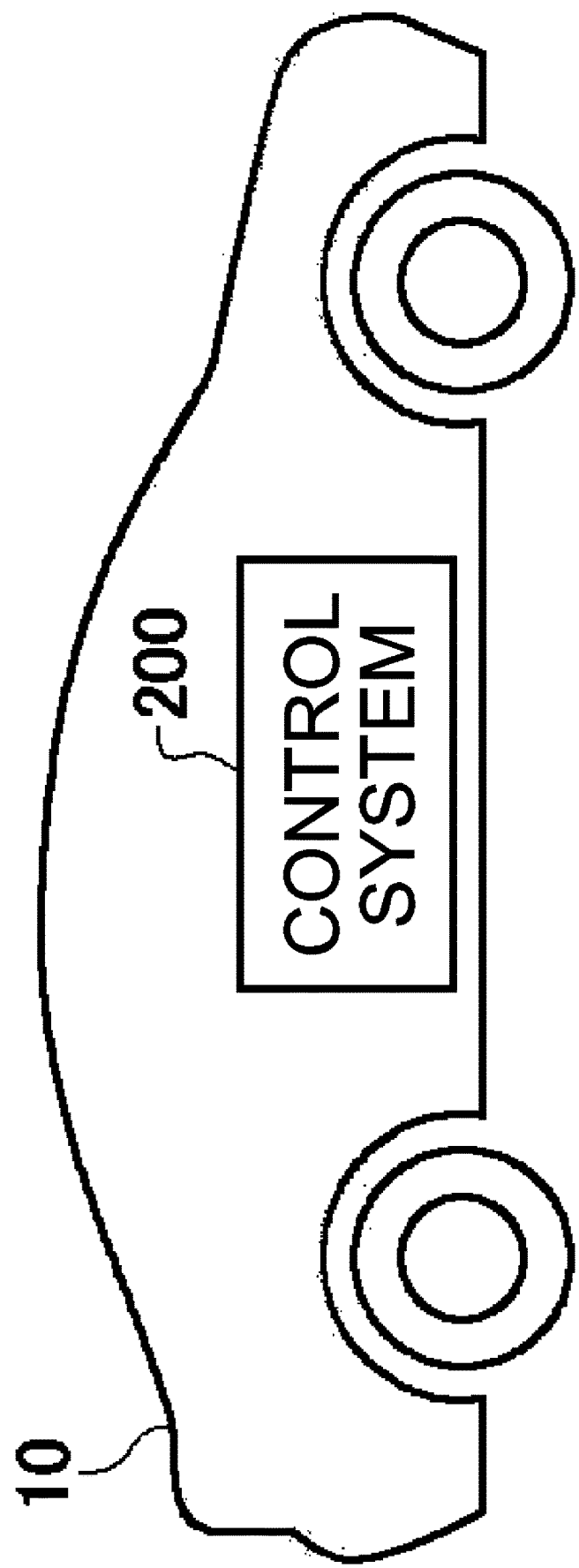
FIG. 1 schematically illustrates a vehicle.

FIG. 1 schematically illustrates a vehicle 10 according to the present embodiment. The vehicle 10 includes a control system 200 for controlling the vehicle 10. In the present embodiment, a hybrid vehicle is used for describing the vehicle 10 as an example. However, the vehicle 10 may be a vehicle driven by any drive system, such as an engine vehicle and an electric vehicle.

Figure 2:
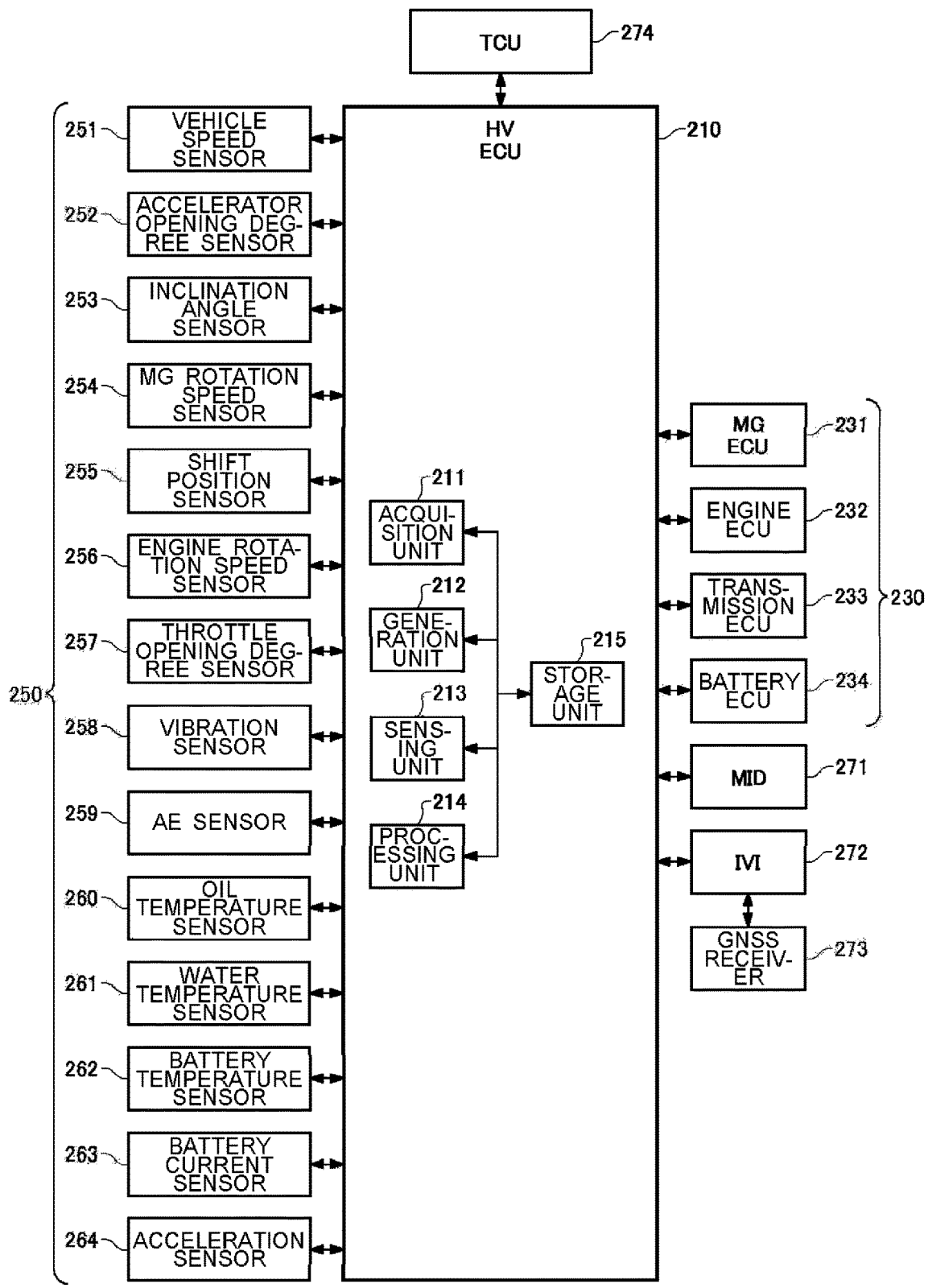
FIG. 2 schematically illustrates a system configuration of a control system.

FIG. 2 schematically illustrates a system configuration of a control system 200. The control system 200 includes an HVECU 210, various ECUs 230, various sensors 250, a MID 271, an IVI 272, a GNSS receiver 273, and a TCU 274.

The HVECU 210 is a hybrid ECU (Electronic Control Unit) for controlling the vehicle 10. The HVECU 210 and various ECUs 230 may be configured to include a so-called microcomputer consisting of a CPU, a ROM, a RAM, an input/output interface, and the like. The HVECU 210 processes a signal in accordance with a program stored in advance in the ROM while utilizing a temporary storage function of the RAM.

The HVECU 210 is connected to the MID 271, the IVI 272, the TCU 274, and each ECU 230 via an in-vehicle communication line. The HVECU 210 communicates with the MID 271, the IVI 272, the TCU 274, and various ECUs 230 via the in-vehicle communication line. The HVECU 210 integrally controls the MID 271, the IVI 272, the TCU 274, and each ECU 230 via the in-vehicle communication line. The in-vehicle communication line may be configured to include, for example, a CAN (Controller Area Network), an EtherNetwork, or the like.

The MID 271 is a multi-information display. The IVI 272 is a piece of in-vehicle infotainment (IVI) information equipment. The MID 271 and the IVI 272 are connected to the HVECU 210 via the in-vehicle communication line. The MID 271 and the IVI 272 may function as display control units. The IVI 272 has a wireless LAN communication function. The location of the vehicle 10 is identified based on a signal received from a GNSS (Global Navigation Satellite System) satellite. The IVI 272 acquires location information of the vehicle 10 from the GNSS receiver 273. The IVI 272 outputs, to the HVECU 210, the location information acquired from the GNSS receiver 273.

The TCU 274 is a telematics control unit. The TCU 274 is mainly responsible for mobile communication. The TCU 274 sends data to and receives data from an external apparatus according to the control by the HVECU 210.

Each ECU 230 includes an MGECU 231, an engine ECU 232, a transmission ECU 233, and a battery ECU 234. The MGECU 231 controls a motor generator for driving, mounted on the vehicle 10. The engine ECU 232 controls the engine mounted on the vehicle 10. The transmission ECU 233 controls the transmission mounted on the vehicle 10. The battery ECU 234 control a battery which is a high-voltage battery mounted on the vehicle 10.

The HVECU 210 performs a hybrid drive control relating to the motor generator via MGECU 231 and the engine via the engine ECU 232. The HVECU 210 performs a shift control of the transmission via the transmission ECU 233. The HVECU 210 controls the charge/discharge of the battery via the battery ECU 234.

The various sensors 250 include a vehicle speed sensor 251, an accelerator opening degree sensor 252, an inclination angle sensor 253, an MG rotation speed sensor 254, a shift position sensor 255, an engine rotation speed sensor 256, a throttle opening degree sensor 257, a vibration sensor 258, an AE sensor 259, an oil temperature sensor 260, a water temperature sensor 261, battery temperature sensor 262, a battery current sensor 263, and an acceleration sensor 264. The various sensors 250 may include other sensors.

The vehicle speed sensor 251 detects a vehicle speed of the vehicle 10. The accelerator opening degree sensor 252 detects the accelerator opening degree by the operation of a driver, that is, an operation quantity of an accelerator pedal. The inclination angle sensor 253 detects the inclination of the vehicle 10. The MG rotation speed sensor 254 detects the rotation speed of the motor generator. The shift position sensor 255 detects the shift position of a shift lever. The engine rotation speed sensor 256 detects the rotation speed of the engine. The throttle opening degree sensor 257 detects the opening degree of a throttle valve of the engine. The battery temperature sensor 262 detects the temperature of the battery. The battery current sensor 263 detects the charging or discharging current of the battery.

The HVECU 210 sets a required driving force based on the vehicle speed detected by the vehicle speed sensor 251 and the accelerator opening degree detected by the accelerator opening degree sensor 252. The HVECU 210 determines whether the vehicle 10 is at the time of start based on the vehicle speed detected by the vehicle speed sensor 251. The HVECU 210 determines whether the vehicle 10 is on an uphill road or a downhill road based on the inclination angle detected by the inclination angle sensor 253. The engine ECU 232 controls an output torque from the engine in accordance with the set required driving force based on the instruction from the HVECU 210. The MGECU 231 controls the output torque from the motor generator in accordance with the set required driving force based on the instruction from the HVECU 210. The transmission ECU 233 performs the shift control of the transmission in accordance with the set required driving force.

The battery ECU 234 controls the charge/discharge of the battery based on battery information indicating the state of the battery, such as an inter-terminal voltage of the battery, the charging or discharging current of the battery from the battery current sensor 263, and the battery temperature from the battery temperature sensor 262. The battery ECU 234 computes the charging amount (SOC) based on an integrated value of the charging or discharging current of the battery.

The vibration sensor 258 senses the vibration of a portion of the vehicle 10, which allows sensing the symptom of failure of the vehicle 10, such as the vibration of the vehicle 10, the vibration of the engine, the vibration of the suspension, for example. The AE sensor 259 is an Acoustic Emission sensor. The AE sensor 259 is a sensor for detecting ultrasonic and elastic wave energy occurring following a phenomenon such as the deformation, progress of crack, and delamination of an object. The AE sensor 259 may be provided at a portion of the vehicle 10 that allows sensing the symptom of failure of the vehicle 10, such as the engine. The oil temperature sensor 260 detects the temperature of the engine oil (oil temperature), for example. The water temperature sensor 261 detects, for example, the temperature of cooling water flowing in a water jacket which is a cooling water channel formed in a cylinder head and a cylinder. The acceleration sensor 264 detects the acceleration of the vehicle 10 in order to determine whether the vehicle 10 is in an acceleration state, a deceleration state, or a constant speed state (cruise state).

In the control system 200 configured as described above, the symptom of failure of the vehicle 10 is sensed based on various types of data collected from the various sensors 250.

In the present embodiment, the HVECU 210 functions as a failure symptom sensing system for sensing the symptom of failure of the vehicle 10. The HVECU 210 includes an acquisition unit 211, a generation unit 212, a sensing unit 213, a processing unit 214, and a storage unit 215. It should be noted that an ECU 230 other than the HVECU 210 may function as the failure symptom sensing system.

The acquisition unit 211 acquires a plurality of data from a plurality of sensors 250 for sensing the state of the vehicle 10 while the vehicle 10 is moving, that is, while driving. The acquisition unit 211 acquires the plurality of data from the plurality of sensors 250 for sensing the state of the vehicle 10 for every predetermined period while the vehicle 10 is moving. The acquisition unit 211 acquires, for example, as the plurality of data, an engine rotation speed (R) from the engine rotation speed sensor 256, a vehicle speed (V) of the vehicle 10 from the vehicle speed sensor 251, a cooling water temperature (T) indicating the temperature of the cooling water of the engine from the water temperature sensor 261 at intervals of 0.2 seconds and stores them in the storage unit 215, as shown in FIG. 3.

The generation unit 212 generates, from the plurality of data acquired by the acquisition unit 211, feature quantity data indicating a feature quantity of each of the plurality of data in accordance with a predetermined algorithm. The generation unit 212 may generate a numeric vector as the feature quantity data indicating the feature quantity of each of the plurality of data. The generation unit 212 may generate the numeric vector of each of the plurality of data by calculating the average value, maximum value, minimum value, and average value of the inclination of the data for every predetermined period (for example, three seconds). The generation unit 212 may calculate the average value ($R_{av}$), maximum value ($R_{mx}$), minimum value ($R_{mn}$), and average value of the inclination ($R_{in}$) of the engine rotation speed (R) for every three seconds, as shown in FIG. 4. The generation unit 212 may calculate the average value ($V_{av}$), maximum value ($V_{mx}$), minimum value ($V_{mn}$), and average value of the inclination ($V_{in}$) of the vehicle speed (V) for every three seconds. The generation unit 212 may calculate the average value ($T_{av}$), maximum value ($T_{mx}$), minimum value ($T_{mn}$), and average value of the inclination ($T_{in}$) of the cooling water temperature (T) for every three seconds. The generation unit 212 may calculate at least one of the standard deviation, amplitude value, frequency, minimum inclination, maximum inclination, skewness, and kurtosis, which are used in statistics, as a feature quantity of data.

The inclination herein is a feature quantity being an index to determine the degree of acceleration and deceleration of the vehicle 10 and whether the vehicle 10 is taking a cruise drive (constant speed drive). The inclination is a value obtained by differentiating the variation of a parameter value f(x) with respect to a time lapse (h) and is calculated by the following equation (1). In a digital computation, the inclination is calculated by computing a difference of the parameter value f(x).

$$\lim \frac{f(x+h)-f(x)}{h} \quad (1)$$

The generation unit 212 generates reference feature quantity data to be used as a reference for determining whether the symptom of failure of the vehicle 10 exists, based on the plurality of generated feature quantity data. The generation unit 212 may generate, from the plurality of numeric vectors, a reference value as the reference feature quantity data.

The generation unit 212 may perform clustering processing on the plurality of numeric vectors to generate the reference value. The clustering processing is a method of data analysis that groups data without an external reference. In the present embodiment, a method called a K-means method is used. This method plots data on a space having dimensions corresponding to the number of parameters to classify the data according to their distance.

The generation unit 212 performs a clustering on feature quantities of three parameters, for example, the engine rotation speed (R), the vehicle speed (V), and the cooling water temperature (T), among data of various sensors 250 to extract "20" clusters (a primary clustering). Further, the generation unit 212 clusters each of the "20" clusters extracted in the primary clustering into "30" clusters using all parameters (the secondary clustering), to extract "600" clusters, that is, driving conditions.

More specifically, first, the generation unit 212 classifies, based on core vectors, numeric vectors for each period into twenty primary clusters Dj, for example, as shown in FIG. 5, by the primary clustering. In an initial state where the core vectors are not set, the generation unit 212 randomly sets the core vectors to be the centers of the twenty primary clusters. Initial values of the core vectors may be set in accordance with the rule of thumb from a limited number of experimental data.

Where j is an integer from 1 to 20, and the core vectors to be the center of a j-th cluster is represented by ($R_{av-cj}$, $R_{mx-cj}$, $R_{mn-cj}$, $R_{in-cj}$, $V_{av-cj}$, $V_{mx-cj}$, $V_{mn-cj}$, $V_{in-cj}$, $T_{av-cj}$, $T_{mx-cj}$, $T_{mn-cj}$, $T_{in-cj}$), a Manhattan distance D1$j$ between numeric vectors of a first period (0 to 3 seconds) shown in FIG. 4 and core vectors of each of the twenty clusters Dj is represented by the following equation (2).

$$D1j=|R_{av-1}-R_{av-cj}|+|R_{mx-1}-R_{mx-cj}|+|R_{mn-1}-R_{mn-cj}|+ \\ |R_{in-1}-R_{in-cj}|+|V_{av-1}-V_{av-cj}|+|V_{mx-1}-V_{mx-cj}|+|V_{mn-1}-V_{mn-q}|+|V_{in-1}-V_{in-cj}|+|T_{av-1}-T_{av-cj}|+|T_{mx-1}-T_{mx-cj}|+|T_{mn-1}-T_{mn-cj}|+|T_{in-1}-T_{in-cj}| \quad (2)$$

The generation unit 212 calculates the Manhattan distance by computation using the equation (2) for one numeric vector (R, V, T) of the first period and j=1, 2, 3, ..., 20 to cause the numeric vector (R, V, T) to belong to a cluster Dj having the core vector in which the Manhattan distance shows the minimum value. The generation unit 212 calculates the Manhattan distance for each numeric vector of each period (3 to 6 seconds) to cause each numeric vector to belong to one of cluster Dj.

Then, the generation unit 212 calculates the average value of numeric vectors belonging to each of the twenty primary clusters Dj. The average value is considered as the core vector of each cluster. The generation unit 212 performs the above-described clusterings again by using the updated core vector. When the core vector of each cluster is updated by the second clustering, the generation unit 212 additionally performs a third clustering by using the updated core vector.

The generation unit 212 performs this repetition until the core vectors converge or until a preset number of attempts are completed.

The core vectors of the initial setting may influence how the core vectors converge. Therefore, the generation unit 212 may set, for example, ten different initial settings randomly and repeat the clustering by using each initial setting to employ one clustering result of an attempt in which the core vectors have converged best. In this manner, the generation unit 212 generates the final core vector (center of gravity) for each of the twenty primary clusters Dj.

Then, the generation unit 212 performs secondary clustering processing. The generation unit 212 further performs, in each of the twenty primary clusters Dj, a clustering on numeric vectors of all parameters included in the cluster (which are numeric vectors of FIG. 4 being expanded into all parameters) to classify each primary cluster into thirty secondary clusters. In other words, each of the twenty primary clusters corresponding to different driving states is subdivided into thirty secondary clusters.

The secondary clustering is performed on each primary cluster to form thirty secondary clusters, and accordingly, six hundred (20×30) secondary clusters are obtained overall. Each numeric vector belongs to one of these six hundred secondary clusters.

The generation unit 212 may set initial values of the core vectors of thirty secondary clusters used in the secondary clustering randomly as in the primary clustering. The generation unit 212 may set these initial values in accordance with the rule of thumb in reference to past data. The generation unit 212 may update these core vectors by the same method as in the primary clustering to generate final core vectors, and may perform a final clustering using thirty final core vectors to generate six hundred secondary clusters.

Then, the generation unit 212 creates, from data of the six hundred secondary clusters, a histogram having twenty divisions, where the horizontal axis is the value of parameters for each parameter and the vertical axis is the number of data, as shown in FIG. 6. As shown in FIG. 6B, the generation unit 212 excludes a class having a value of the vertical axis below a predetermined value (for example, a % of the total). Additionally, the generation unit 212 performs grouping by gathering neighboring remaining classes together as a group so that the number of data belonging to a group becomes b % or more, as shown in 6C. The generation unit 212 performs this processing individually for every cluster, that is, six hundred secondary clusters.

Figure 6A:
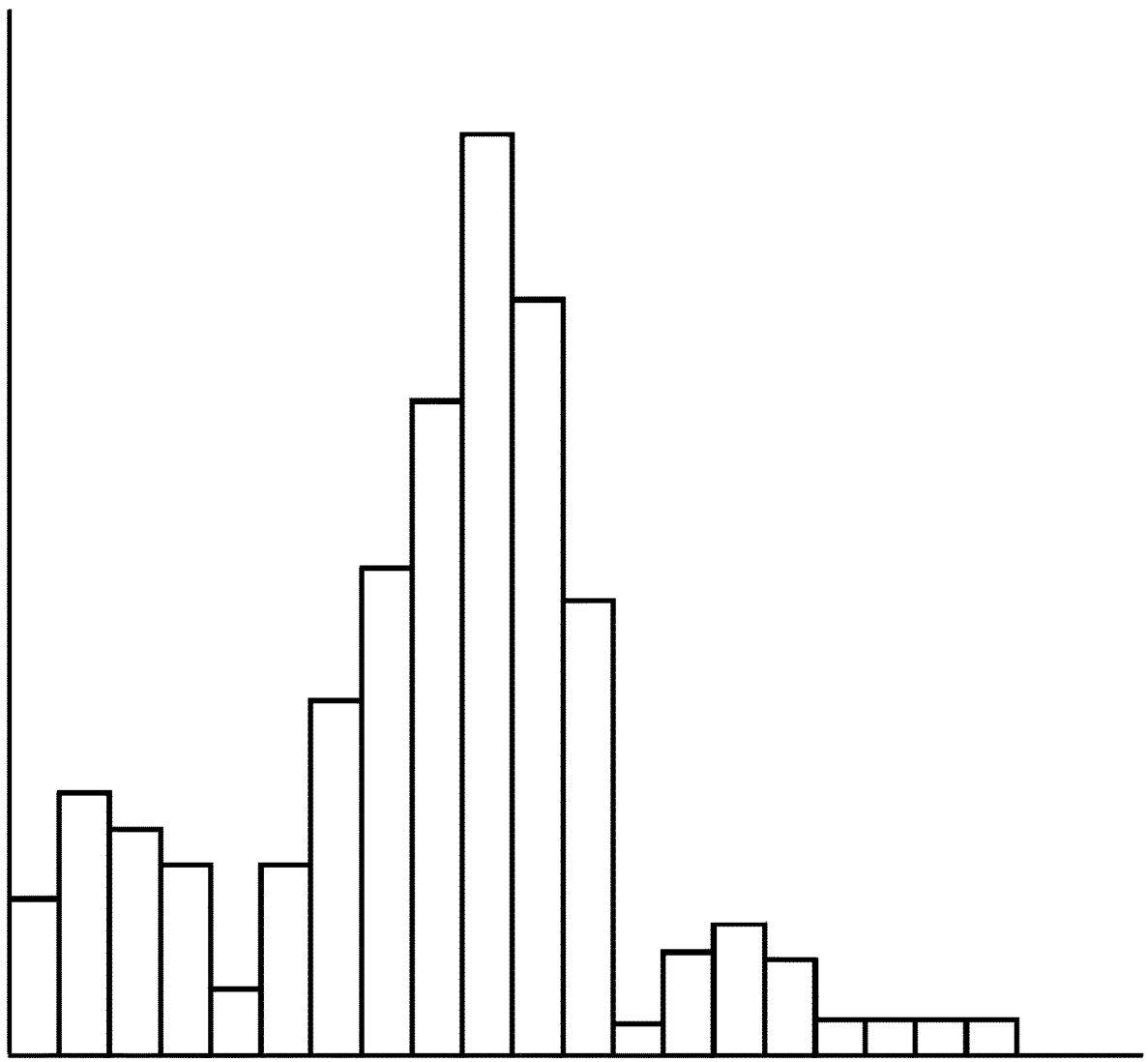
FIG. 6A illustrates one example of a histogram representing the appearance frequency of the numerical value of a feature quantity.
Figure 6B:
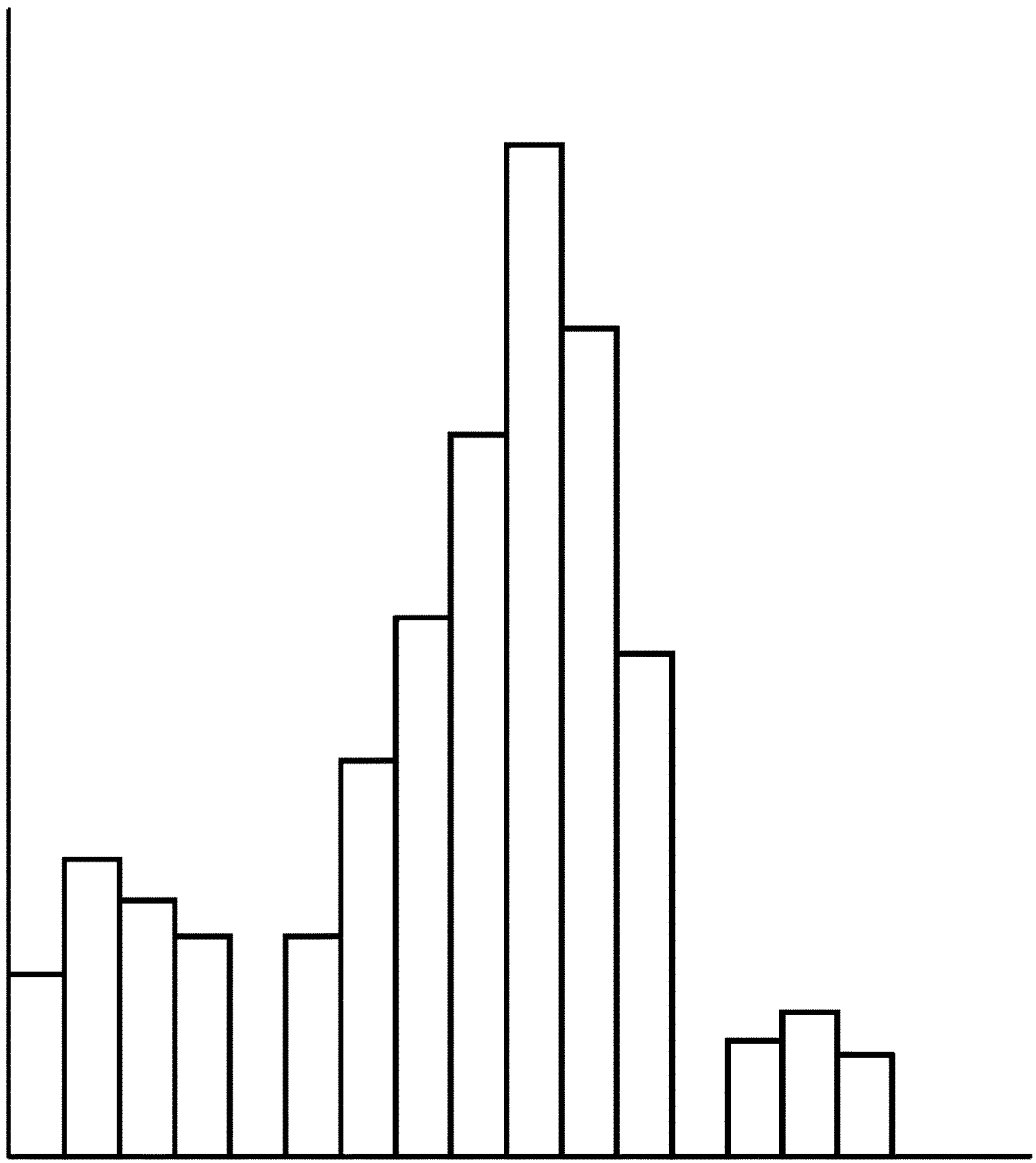
FIG. 6B illustrates one example of a histogram representing the appearance frequency of the numerical value of a feature quantity.
Figure 6C:
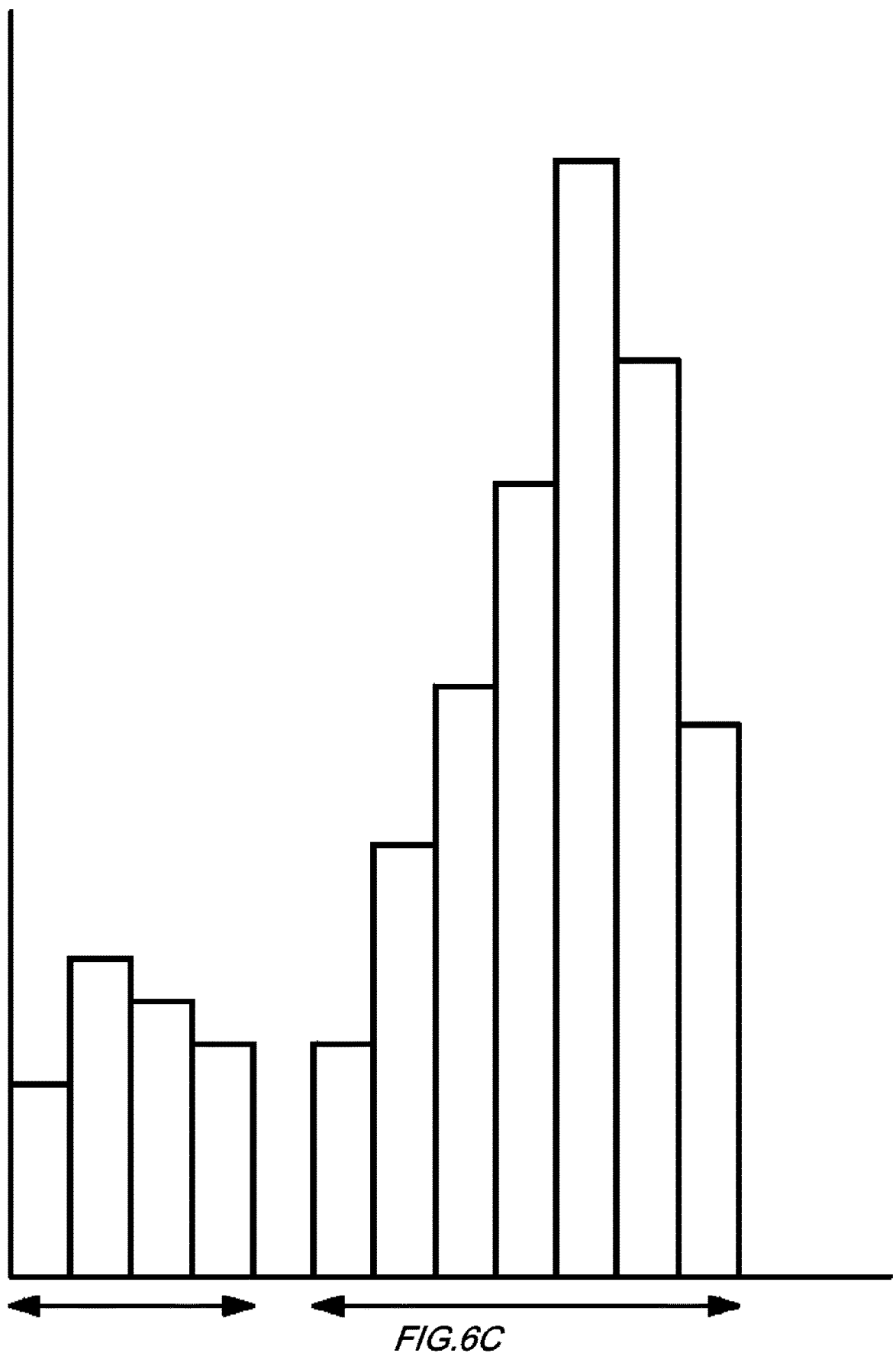
FIG. 6C illustrates one example of a histogram representing the appearance frequency of the numerical value of a feature quantity.
Figure 6D:
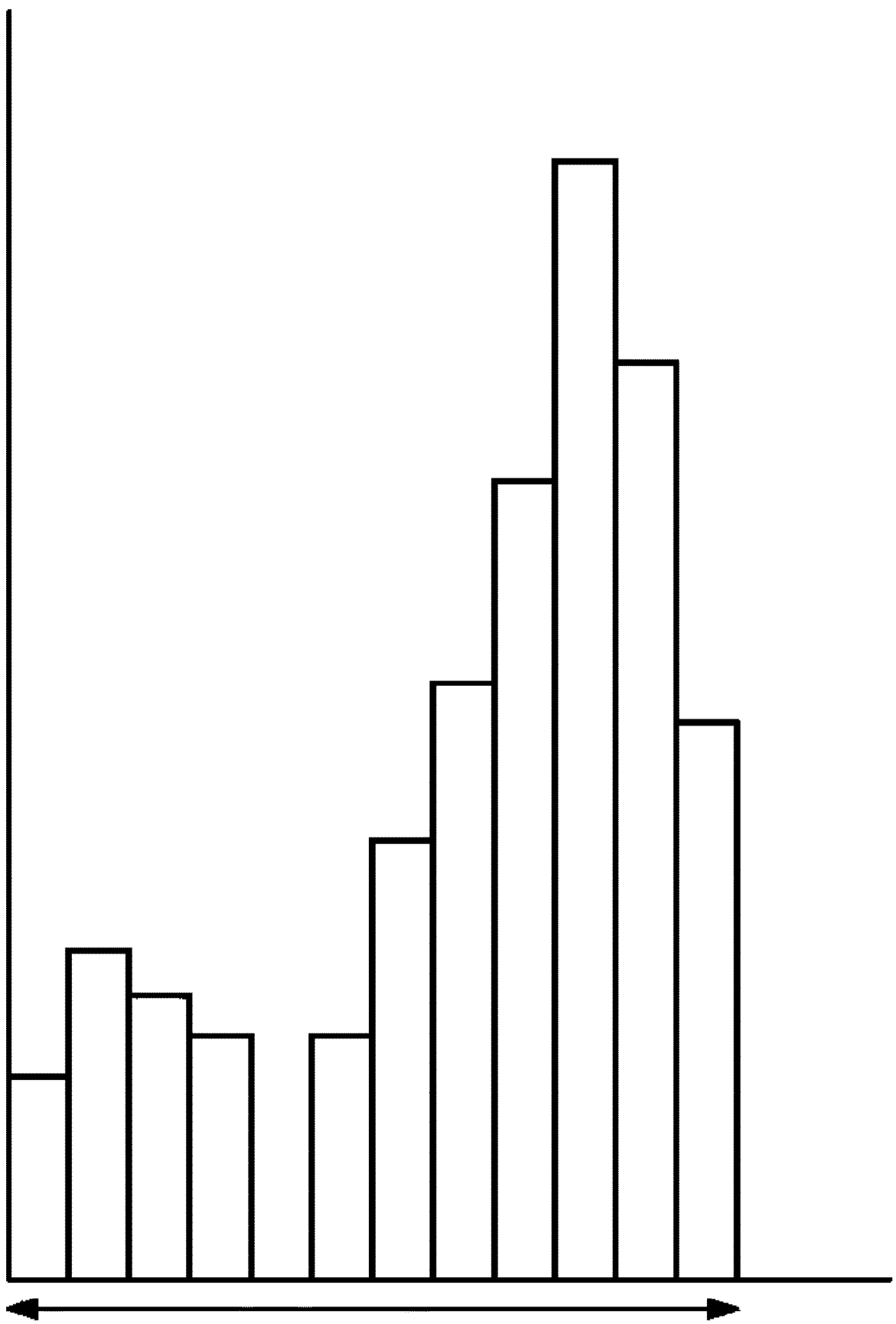
FIG. 6D illustrates one example of a histogram representing the appearance frequency of the numerical value of a feature quantity.

The generation unit 212 adjusts the values of a % and b % depending on a parameter residual of the clustering indicating dispersion of data in the secondary clusters. The parameter residual is a value representing the evaluation of the degree to which the value of the parameter of each of the numeric vectors is far from the core vector which is the center of gravity of the cluster to which the numeric vector belongs. In the present embodiment, the residual is represented by the mean square (square root of sum of squares) of the difference between each numeric vector and the center of gravity of the cluster to which the numeric vector belongs. The mean square is used to see the magnitude of the difference because a simple difference has a plus or minus symbol. As the parameter residual is larger and the dispersion of the parameter is larger, the generation unit 212 causes the values of a % and b % to be smaller to extract ranges of normal values widely as shown in FIG. 6D. The generation unit 212 gathers the ranges of normal values into one, which is the range for the reference values used for the failure symptom sensing.

For example, a histogram as shown in FIG. 7A is obtained as one of the feature quantities of a parameter. If a hundred numeric vectors are included in the cluster, the total counted number is 100. A row of "RANGE OF VALUES OF COLUMN" having a count of a % or less of the total counted number is deleted. When a % is 1%, a row of "RANGE OF VALUES OF COLUMN" having a counted number of 1 or less is deleted, and thus rows of "RANGE OF VALUES OF COLUMN" remain on the table as shown in FIG. 7B.

The generation unit 212 combines and groups neighboring rows of "RANGE OF VALUES OF COLUMN" among the remaining rows of "RANGE OF VALUES OF COLUMN" as shown in FIG. 7C. Additionally, the generation unit 212 deletes, among the groups, a group having a counted number of b % or less of the total counted number. For example, the generation unit 212 deletes a group of the group ID of 3 as a group having a counted number of 20% or less and leaves groups on the table as shown in FIG. 7D.

The generation unit 212 set columns in the groups left on the table as described above, that is, the range of feature quantities of the parameter, as the range of normal values. In this example, 0.0-0.1 and 0.3-0.7 are the ranges of normal values. To facilitate the data processing, the ranges of normal values are gathered to one, which is the range of the reference values used for the failure symptom sensing. In this example, the generation unit 212 determines 0.0-0.7 as the range of reference values.

The clustering processing, the setting of the reference values, and the failure symptom sensing described above consume a memory capacity, consume power largely, and impose a heavy processing burden of ECUs. For example, the processing burden of the HVECU 210 increases when the HVECU 210 performs the above-described processing and the driving control processing at the same time while vehicle 10 is driving.

Therefore, in the present embodiment, the HVECU 210 performs, when the HVECU 210 senses an instruction to stop the driving function of the vehicle 10, the clustering processing, the setting of the reference values, and the failure symptom sensing. This can reduce the processing burden of the HVECU 210. This provides suppression of the memory capacity consumption and the power consumption while the vehicle 10 is driving.

The acquisition unit 211 acquires, while a driving function of the vehicle 10 is in operation, data from at least one of the sensors 250 for sensing the state of the vehicle 10. The "while a driving function of the vehicle 10 is in operation" means that the vehicle 10 is in a travelable state. The "while a driving function of the vehicle 10 is in operation" means an ignition ON state in which an ignition switch is turned on. The "while a driving function of the vehicle 10 is in operation" means, for example, that the engine is in operation. The "while a driving function of the vehicle 10 is in operation" means that the control system 200 is running and various pieces of equipment such as ECUs required for the driving of the vehicle 10 are in the switch ON state. The acquisition unit 211 acquires the plurality of data from the plurality of sensors 250 for sensing the state of the vehicle 10 while the vehicle 10 is driving. The acquisition unit 211 stores, when the acquisition unit 211 acquires the plurality of data, the plurality of data in the storage unit 215.

The generation unit 212 generates, from the plurality of data, the numeric vectors as the feature quantity data indicating the feature quantity of the plurality of data in accordance with a predetermined algorithm, while the vehicle 10 is driving. The generation unit 212 stores, after the generation unit 212 generates the numeric vectors based on the plurality of data read out from the storage unit 215, the numeric vectors in the storage unit 215 and deletes the plurality of data from the storage unit 215.

The generation unit 212 generates, when the generation unit 212 senses the instruction to stop the driving function of the vehicle 10, the predetermined reference feature quantity data based on the plurality of numeric vectors stored in the storage unit 215. In other words, the generation unit 212 determines the range of reference values. For example, the generation unit 212 senses the instruction to stop the driving function of the vehicle 10 by the HVECU 210 sensing, from a sensor for detecting the ON/OFF of the ignition switch, an OFF signal indicating the OFF of the ignition switch, in response to the operation for turning the ignition OFF by the user.

Here, the operation for turning the ignition OFF is an operation performed by the user to cause the vehicle 10 to be in the ignition OFF state, for example, twisting a key of the vehicle 10 inserted in an ignition key cylinder to turn the ignition switch OFF, continuing pushing a button of a push switch for starting/stopping a drive mechanism like an engine for a certain time period, or the like. Also, the ignition OFF state is a state in which battery voltage is not supplied to a power source line of an ignition system in the vehicle, and contrarily, the ignition ON state is a state in which the battery voltage is supplied to the power source line of the ignition system in the vehicle and all the electric components of the vehicle are in an operable state.

When the HVECU 210 senses, via the shift position sensor 255, a signal indicating that the shift lever of the vehicle 10 is at a parking position, the instruction to stop the driving function of the vehicle 10 may be sensed.

The sensing unit 213 senses, when the sensing unit 213 senses the instruction to stop the driving function of the vehicle 10, whether an indication of failure of the vehicle 10 exists based on the feature quantity data and a predetermined reference feature quantity data. The sensing unit 213 senses whether the indication of failure of the vehicle 10 exists by determining whether each value of each of the plurality of numeric vectors stored in the storage unit 215 is included in the range of reference values.

The sensing unit 213 may determine, when the sensing unit 213 senses the instruction to stop the driving function of the vehicle 10, whether the charging state (SOC) of the battery to supply power to the HVECU 210 satisfies a predetermined charging state. Then, when the charging state (SOC) of the battery satisfies the predetermined charging state, that is, when the charging amount of the battery is a threshold or more, the sensing unit 213 may perform the clustering processing, the setting of the reference value, and the failure symptom sensing. When the charging state (SOC) of the battery does not satisfy the predetermined charging state, that is, when the charging amount of the battery is a threshold or less, the sensing unit 213 may not perform the clustering processing, the setting of the reference value, and the failure symptom sensing.

The sensing unit 213 deletes the feature quantity data from the storage unit 215 after the sensing unit 213 senses whether the indication of failure of the vehicle 10 exists. The sensing unit 213 deletes, after the sensing unit 213 senses whether the indication of failure of the vehicle 10 exists, the plurality of numeric vectors generated by the generation unit 212 while the vehicle 10 is driving, from the storage unit 215.

The sensing unit 213 may update, after the sensing unit 213 senses whether the indication of failure of the vehicle 10 exists, vehicle information stored in the storage unit 215 in accordance with the sensing result. The sensing unit 213 updates, when the sensing unit 213 senses that the symptom of failure of the vehicle 10 exists in a particular portion, the vehicle information to indicate that the symptom of failure in the particular portion of the vehicle 10 exists. The sensing unit 213 updates the vehicle information to indicate that a symptom of failure in a particular portion of the vehicle 10 exists, together with the clock time of the sensing. The sensing unit 213 may update, when sensing that the indication of failure of the vehicle 10 does not exist, the vehicle information to indicate that an indication of failure in a particular portion of the vehicle 10 does not exist, together with the clock time of the sensing. The sensing unit 213 may not update, when sensing that the indication of failure of the vehicle 10 does not exist, the current vehicle information stored in the storage unit 215 and may complete the processing.

After the sensing unit 213 updates the vehicle information stored in the storage unit 215 after the processing unit 214 receives the instruction to stop the driving function of the vehicle 10, the processing unit 214 may complete a processing to stop the driving function of the vehicle 10. After the OFF signal of the ignition switch is sensed, and the clustering processing; the clustering processing, the setting of the reference value, and the failure symptom sensing are completed; and the storage unit 215 completes updating the vehicle information, the processing unit 214 may complete shutdown processing of the control system 200 to perform the processing to stop the driving function of the vehicle 10. When the shutdown processing of the control system 200 is completed, the vehicle 10 becomes in the ignition OFF state, meaning the state in which battery voltage is not supplied to the power source line of the ignition system in the vehicle 10.

The sensing unit 213 determines, when the sensing unit 213 senses the instruction to activate the driving function of the vehicle 10, whether the vehicle information stored in the storage unit 215 indicates that there exists the indication of failure of the vehicle 10. When the vehicle information stored in the storage unit 215 indicates that there exists the indication of failure of the vehicle 10, the sensing unit 213 notifies an outside of vehicle information according to the sensing result. The sensing unit 213 determines, for example, when the sensing unit 213 senses the ON signal of the ignition switch, whether the vehicle information stored in the storage unit 215 indicates that there exists the indication of failure of the vehicle 10. When the vehicle information stored in the storage unit 215 indicates that there exists the indication of failure of the vehicle 10, the sensing unit 213 displays a message on a display such as the MID 271 to indicate that there exists the symptom of failure together with a portion having the symptom of failure of the vehicle 10 to notify the user.

Figure 8A:
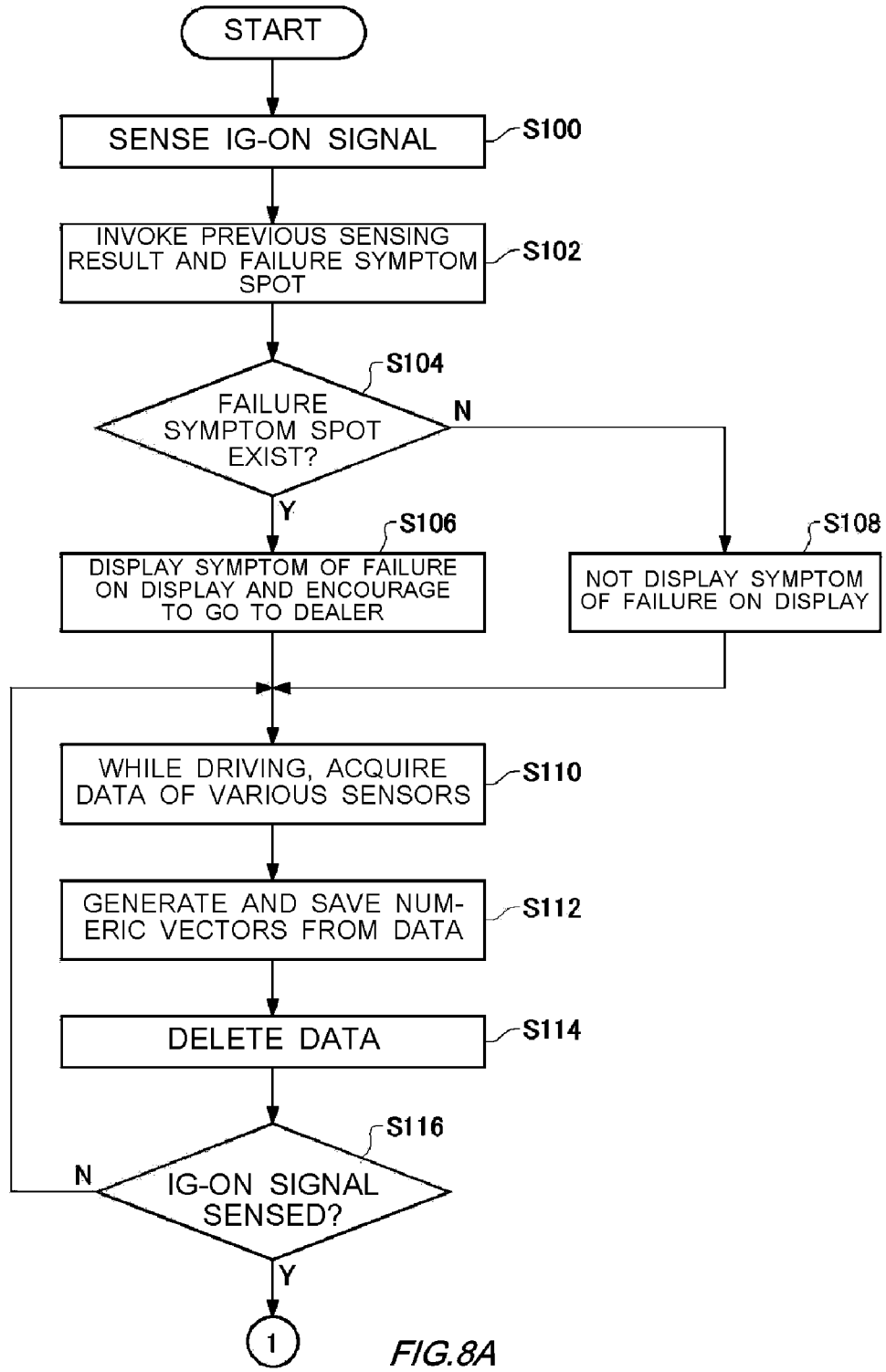
FIG. 8A is a flowchart indicating one example of a procedure of failure symptom sensing processing by an HVECU.
Figure 8B:
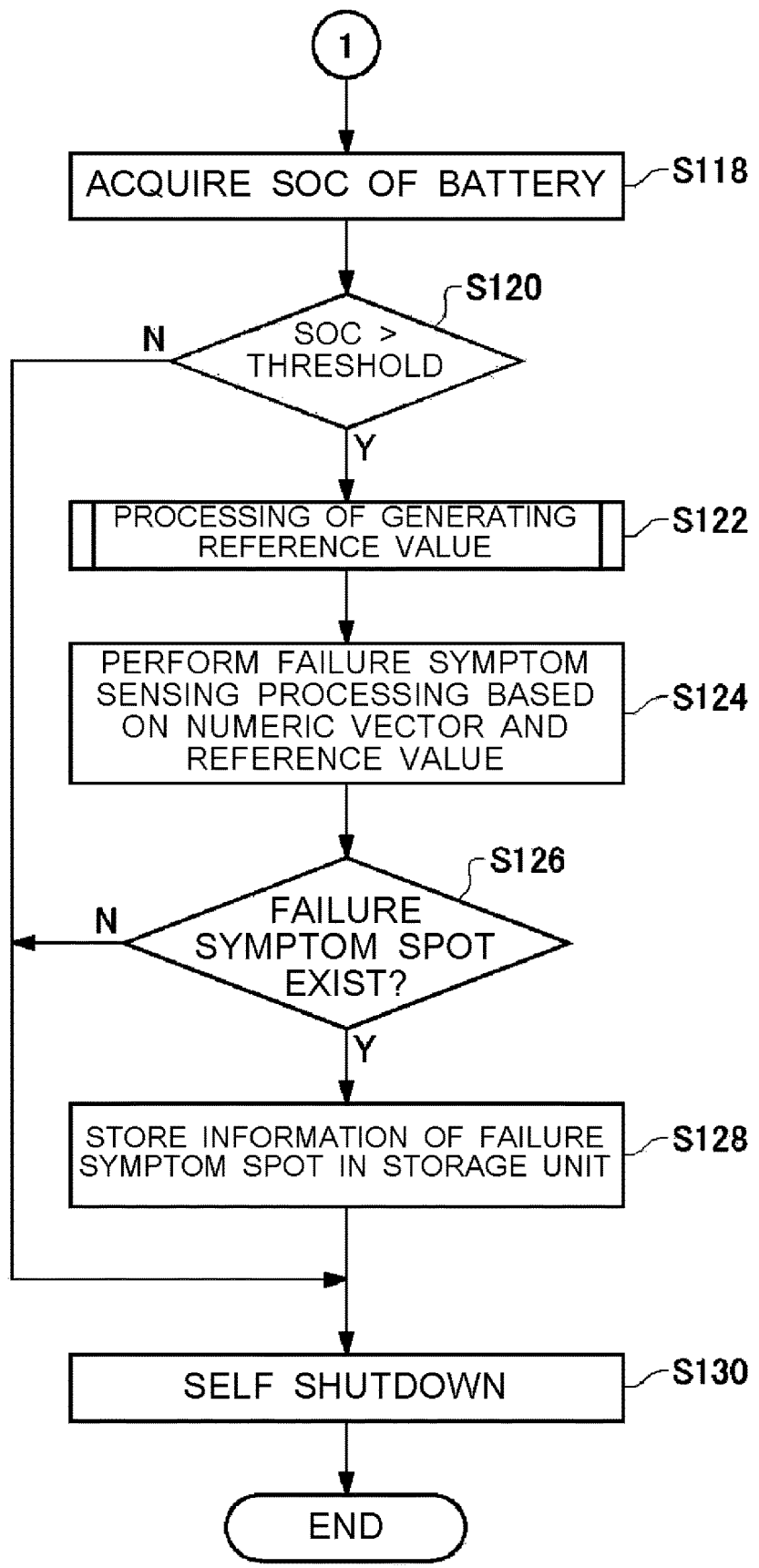
FIG. 8B is a flowchart indicating one example of a procedure of failure symptom sensing processing by an HVECU.

FIG. 8A and FIG. 8B are flowcharts indicating one example of a procedure of failure symptom sensing processing by the HVECU 210.

When the acquisition unit 211 senses the ON signal of the ignition switch (S100), the acquisition unit 211 invokes, with reference to the storage unit 215, the previous sensing result and a failure symptom spot (S102). When the failure symptom spot exists, the sensing unit 213 displays a message on a display such as the MID 271 to indicate that there exists the symptom of failure together with the failure symptom spot and to encourage the user to go to a dealer (S106). Meanwhile, when the failure symptom spot does not exist, the sensing unit 213 does not display a message about the symptom of failure on a display such as the MID 271 (S108).

After that, the acquisition unit 211 acquires, from each of the various sensors 250, data at predetermined intervals (for example 0.2 seconds), while the vehicle 10 is driving (S110). The generation unit 212 generates, from the plurality of data acquired from each of the various sensors 250, the numeric vectors for the predetermined period in accordance with the predetermined algorithm to save the numeric vectors in the storage unit 215 (S112). The generation unit 212 deletes, when the generation unit 212 generates the numeric vectors, the plurality of data from the various sensors 250 used for creating the numeric vectors from the storage unit 215 (S214). The acquisition unit 211 repeats the processing from step S110 to step S114 until sensing the OFF signal of the ignition switch (S116).

The generation unit 212 acquires, when the generation unit 212 senses the OFF signal of the ignition switch, the charging state (SOC) of the battery to supply power to the HVECU 210 to determine whether it is indicated that charging state is a threshold or more (S120). When it is indicated that charging state of the battery is a threshold or less, the processing unit 214 completes self shutdown processing. That is, the processing unit 214 stops the driving function of the vehicle 10 to turn off the switch of the equipment required for the driving of the vehicle 10, such as various ECUs 230.

Meanwhile, when it is indicated that charging state of the battery is a threshold or more, the generation unit 212 performs the processing of generating the reference value (S122). Then, the sensing unit 213 invokes the numeric vector and the reference value stored in the storage unit 215 to perform the failure symptom sensing processing (S216). When the failure symptom sensing spot exists (S126), the sensing unit 213 stores the information of the failure symptom spot in the storage unit 215 (S128). The sensing unit 213 may delete, after the sensing unit 213 performs the failure symptom sensing processing, the numeric vectors stored in the storage unit 215.

After the sensing unit 213 stores the failure symptom spot information in the storage unit 215, or when the failure symptom sensing spot does not exist, the processing unit 214 completes the self shutdown processing (S130).

Figure 9:
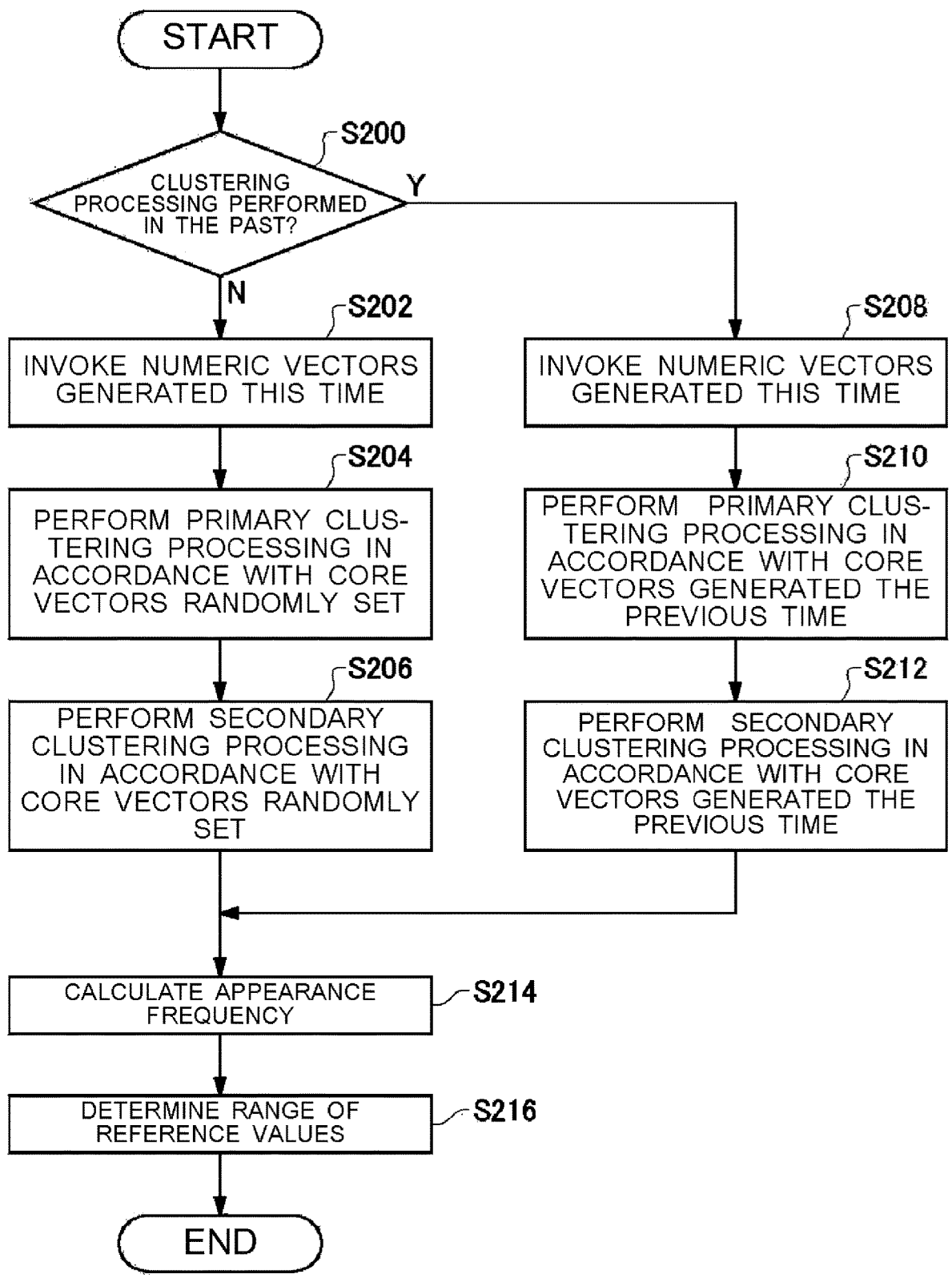
FIG. 9 is a flowchart indicating one example of a procedure of reference value generating processing.

FIG. 9 is a flowchart indicating one example of a procedure of reference value generating processing by the generation unit 212. First, the generation unit 212 determines whether the clustering processing has been performed in the past (S200). The generation unit 212 may determine whether the clustering processing has been performed in the past depending on whether core vectors generated in the past are stored in the storage unit 215.

If the clustering processing has not been performed in the past, the generation unit 212 invokes, from the storage unit 215, the plurality of numeric vectors generated this time while the driving function of the vehicle 10 is in operation (S202). Then, the generation unit 212 performs primary clustering processing in accordance with core vectors randomly set (S204). Additionally, the generation unit 212 performs secondary clustering processing in accordance with the core vectors randomly set (S206).

Meanwhile, if the clustering processing has been performed in the past, the generation unit 212 invokes, from the storage unit 215, the plurality of numeric vectors generated this time while the driving function of the vehicle 10 is in operation (S208). Then, the generation unit 212 invokes, from the storage unit 215, the core vectors for the primary clustering generated the previous time to perform the primary clustering processing in accordance with the core vectors (S210). Additionally, the generation unit 212 invokes, from the storage unit 215, the core vectors for the secondary clustering generated the previous time to perform the secondary clustering processing in accordance with the core vectors (S212).

The generation unit 212 determines, after the generation unit 212 performs the primary clustering processing and the secondary clustering processing, ranges having values with a high appearance frequency as ranges of normal values of data of the various sensors 250 (S214), and gathers those ranges of normal values of data into one to determine the range of reference values (S216).

As described above, according to the present embodiment, the HVECU 210 performs, after the HVECU 210 senses the instruction to stop the driving function of the vehicle 10, the clustering processing, the setting of the reference value, and the failure symptom sensing. In this manner, the processing burden of the HVECU 210 while the driving function of the vehicle 10 is in operation can be reduced. Also, the memory capacity consumption and the power consumption while the vehicle 10 is driving can be suppressed.

Figure 10:
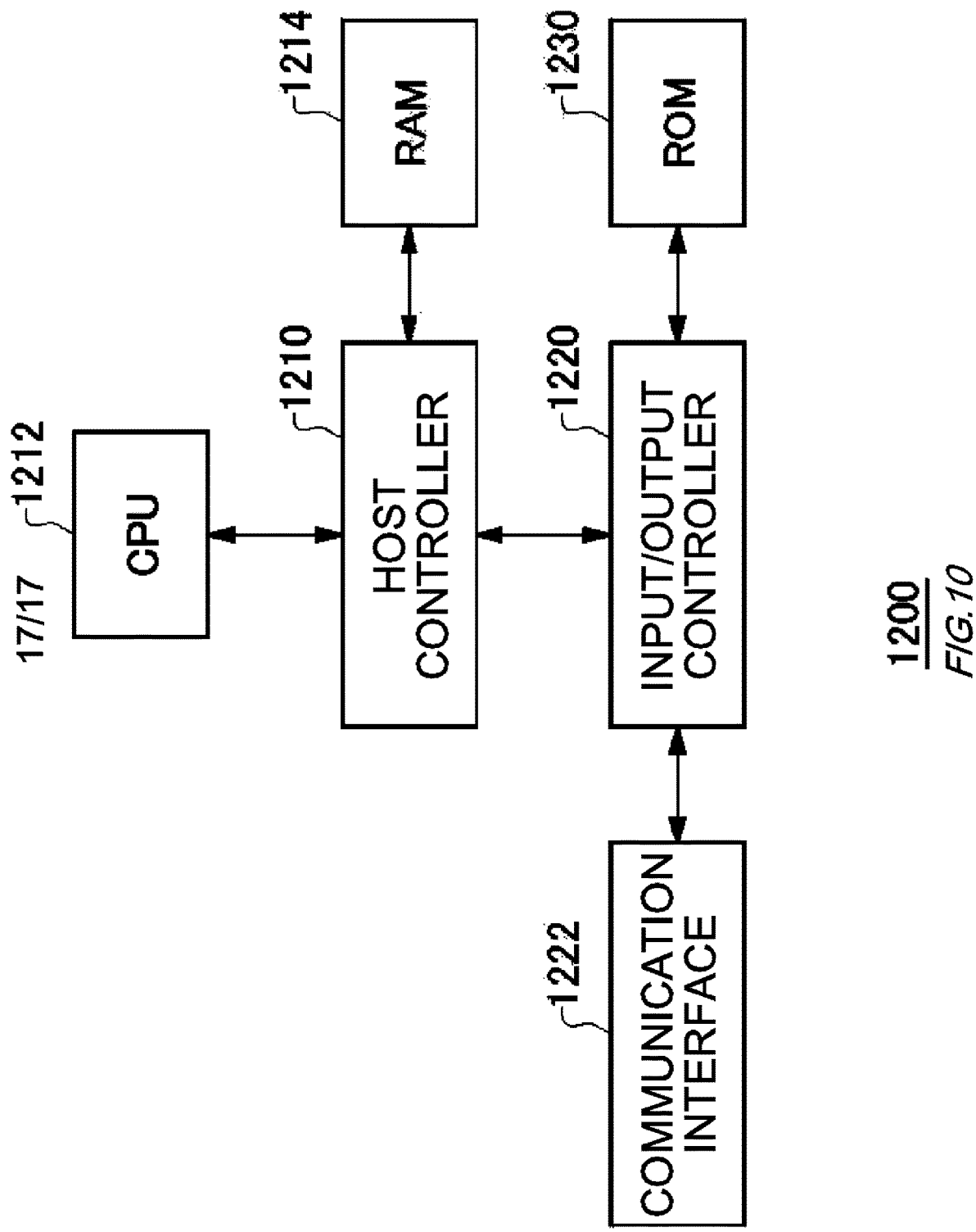
FIG. 10 illustrates one example of a hardware configuration.

FIG. 10 illustrates one example of a computer 1200 in which a plurality of embodiments of the present invention may be entirely or partially embodied. A program installed in the computer 1200 can cause the computer 1200 to function as an operation associated with an apparatus according to the embodiments of the present invention or one or more "units" of the apparatus. Alternatively, the program can cause the computer 1200 to perform the operation or the one or more "units". The program can cause the computer 1200 to execute a process according to the embodiments of the present invention or a step of the process. Such a program may be executed by a CPU 1212 in order to perform the computer 1200 to execute a specific operation associated with some or all of the blocks in the flowcharts and block diagrams described herein.

The computer 1200 according to the present embodiment includes the CPU 1212 and a RAM 1214, which are mutually connected by a host controller 1210. The computer 1200 also includes a communication interface 1222, and an input/output unit, which are connected to the host controller 1210 via an input/output controller 1220. The computer 1200 also includes a ROM 1230. The CPU 1212 operates in accordance with programs stored in the ROM 1230 and the RAM 1214 to control each unit.

The communication interface 1222 communicates with other electronic devices via a network. A hard disk drive may store the program and data used by the CPU 1212 in the computer 1200. The ROM 1230 stores a boot program or the like executed by the computer 1200 during activation, and/or a program depending on the hardware of the computer 1200. The program is provided via a computer-readable recording medium, such as a CD-ROM, a USB memory, or an IC card, or a network. The program is installed in the RAM 1214 or the ROM 1230, which is an example of the computer-readable recording medium and is executed by the CPU 1212. Information processing described in those programs is read by the computer 1200 and provides cooperation between the programs and the above-described various types of hardware resources. The apparatus or method may be configured by realizing operation or processing of information according to the use of the computer 1200.

For example, when communication is performed between the computer 1200 and an external device, the CPU 1212 may execute a communication program loaded in the RAM 1214, and instruct the communication interface 1222 to execute communication processing based on the processing written in the communication program. The communication interface 1222, under control of the CPU 1212, reads transmission data stored in a transmission buffer region provided in a recording medium such as the RAM 1214 or the USB memory, transmits the read transmission data to the network, and writes reception data received from the network into a reception buffer region or the like provided on the recording medium.

Also, the CPU 1212 may cause all or a necessary portion of a file or a database stored in the external recording medium such as the USB memory or the like, to be read by the RAM 1214, and may execute various types of processing on the data on the RAM 1214. Next, the CPU 1212 may write back the processed data into the external recording medium.

Various types of information such as various types of programs, data, tables, and a database may be stored in the recording medium and may be subjected to information processing. The CPU 1212 may execute, on the data read from the RAM 1214, various types of processing including various types of operations, information processing, conditional judgment, conditional branching, unconditional branching, information retrieval/replacement, or the like described herein and specified by instruction sequences of the programs, and writes back the results into the RAM 1214. Also, the CPU 1212 may retrieve information in a file, a database, or the like in the recording medium. For example, in a case where a plurality of entries, each having an attribute value of a first attribute associated with an attribute value of a second attribute, are stored in the recording medium, the CPU 1212 may retrieve, from among the plurality of entries, an entry that meets a condition whose attribute value of the first attribute is designated, read the attribute value of the second attribute stored in said entry, and thereby acquire the attribute value of the second attribute associated with the first attribute meeting a predetermined condition.

The above-described programs or software module may be stored on the computer 1200 or in the computer-readable storage medium in the vicinity of the computer 1200. Also, a recording medium such as a hard disk or RAM provided in a server system connected to a dedicated communication network or the Internet can be used as the computer-readable storage medium, and thereby providing the programs to the computer 1200 via the network.

The computer-readable medium may include any tangible device capable of storing an instruction executed by an appropriate device. As a result, the computer-readable medium having the instruction stored therein includes a product including an instruction which may be executed to create means for executing an operation specified in the flowchart or block diagram. Examples of computer-readable media may include an electronic storage medium, a magnetic storage medium, an optical storage medium, an electromagnetic storage medium, a semiconductor storage medium, and the like. More specific examples of computer-readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include any one of a source code or an object code described in any combination of one or more programming languages. The source code or the object code includes a conventional procedural programming language. The conventional procedural programming language may be an assembler instruction, an instruction-set-architecture (ISA) instruction; a machine instruction; a machine-dependent instruction; a microcode; a firmware instruction; state-setting data; or an object-oriented programming language such as Smalltalk (registered trademark), JAVA (registered trademark), C++, or the like; and a "C" programming language or a similar programming language. The computer-readable instruction may be provided to a general-purpose computer, a special-purpose computer, or a processor or a programmable circuit of another programmable data processing apparatus, locally or via a local area network (LAN), a wide area network (WAN) such as the Internet or the like. The processor or the programmable circuitry may execute the computer-readable instruction in order to create means for executing the operation specified in the flowchart or the block diagram. Examples of the processor include a computer processor, processing unit, microprocessor, digital signal processors, controller, microcontroller, or the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: vehicle
200: control system
210: HVECU
211: acquisition unit
212: generation unit
213: sensing unit
214: processing unit
215: storage unit
230: ECU
231: MGECU
232: engine ECU
233: transmission ECU
234: battery ECU
250: sensor
251: vehicle speed sensor
252: accelerator opening degree sensor
253: inclination angle sensor
254: MG rotation speed sensor
255: shift position sensor
256: engine rotation speed sensor
257: throttle opening degree sensor
258: vibration sensor
259: AE sensor
260: oil temperature sensor
261: water temperature sensor
262: battery temperature sensor
263: battery current sensor
264: acceleration sensor
271: MID
272: IVI
273: GNSS receiver
274: TCU
1200: computer
1210: host controller
1212: CPU
1214: RAM
1230: ROM
1220: input/output controller
1222: communication interface

What is claimed is:

1. A failure symptom sensing system, comprising:
an acquisition unit configured to acquire, while a vehicle is in an ignition ON state, data from a sensor configured to sense a state of the vehicle;
a generation unit configured to generate, from the data, feature quantity data indicating a feature quantity of the data; and
a sensing unit configured to sense, when the sensing unit senses an instruction to make the vehicle being in an ignition OFF state, whether an indication of failure of the vehicle exists based on the feature quantity data and a predetermined reference feature quantity data.

2. The failure symptom sensing system according to claim 1, wherein
the acquisition unit is configured to store, when the acquisition unit acquires the data, the data in a storage unit, and
the generation unit is configured to store, after the generation unit generates the feature quantity data based on the data read out from the storage unit, the feature quantity data in the storage unit and delete the data from the storage unit.

3. The failure symptom sensing system according to claim 2, wherein the sensing unit is configured to delete, after the sensing unit senses whether the indication of failure of the vehicle exists based on the feature quantity data and the predetermined reference feature quantity data, the feature quantity data from the storage unit.

4. The failure symptom sensing system according to claim 3, wherein the sensing unit is configured to store a sensing result in the storage unit when the sensing unit senses that a symptom of failure of the vehicle exists, after the sensing unit senses whether the indication of failure of the vehicle exists based on the feature quantity data and the predetermined reference feature quantity data.

5. The failure symptom sensing system according to claim 4, further comprising:
a processing unit configured to complete processing to stop a driving function of the vehicle after the sensing unit stores the sensing result in the storage unit or senses that the symptom of failure of the vehicle does not exist.

6. The failure symptom sensing system according to claim 4, wherein when the sensing result indicating that the indication of failure of the vehicle is stored in the storage unit, the sensing unit is configured to notify, when the sensing unit senses an instruction to activate the driving function of the vehicle, an outside of information according to the sensing result.

7. The failure symptom sensing system according to claim 5, wherein when the sensing result indicating that the indication of failure of the vehicle is stored in the storage unit, the sensing unit is configured to notify, when the sensing unit senses an instruction to activate the driving function of the vehicle, an outside of information according to the sensing result.

8. The failure symptom sensing system according to claim 2, wherein
the generation unit is configured to generate, when the generation unit senses the instruction to make the vehicle being in the ignition OFF state, the predetermined reference feature quantity data based on the feature quantity data stored in the storage unit, and
the sensing unit is configured to sense, when the sensing unit senses the instruction to make the vehicle being in the ignition OFF state, whether the indication of failure of the vehicle exists based on the predetermined reference feature quantity data generated by the generation unit and the feature quantity data stored in the storage unit.

9. The failure symptom sensing system according to claim 3, wherein
the generation unit is configured to generate, when the generation unit senses the instruction to make the vehicle being in the ignition OFF state, the predetermined reference feature quantity data based on the feature quantity data stored in the storage unit, and
the sensing unit is configured to sense, when the sensing unit senses the instruction to make the vehicle being in the ignition OFF state, whether the indication of failure of the vehicle exists based on the predetermined reference feature quantity data generated by the generation unit and the feature quantity data stored in the storage unit.

10. The failure symptom sensing system according to claim 4, wherein
the generation unit is configured to generate, when the generation unit senses the instruction to make the vehicle being in the ignition OFF state, the predetermined reference feature quantity data based on the feature quantity data stored in the storage unit, and
the sensing unit is configured to sense, when the sensing unit senses the instruction to make the vehicle being in the ignition OFF state, whether the indication of failure of the vehicle exists based on the predetermined reference feature quantity data generated by the generation unit and the feature quantity data stored in the storage unit.

11. The failure symptom sensing system according to claim 5, wherein
the generation unit is configured to generate, when the generation unit senses the instruction to make the vehicle being in the ignition OFF state, the predetermined reference feature quantity data based on the feature quantity data stored in the storage unit, and
the sensing unit is configured to sense, when the sensing unit senses the instruction to make the vehicle being in the ignition OFF state, whether the indication of failure of the vehicle exists based on the predetermined reference feature quantity data generated by the generation unit and the feature quantity data stored in the storage unit.

12. The failure symptom sensing system according to claim 1, wherein the sensing unit determines, when the sensing unit senses the instruction to make the vehicle being in the ignition OFF state, whether a charging state of a battery mounted on the vehicle configured to supply electric power to the failure symptom sensing system satisfies a predetermined charging state, and if the charging state of the battery satisfies the predetermined charging state, the sensing unit is configured to sense whether the indication of failure of the vehicle exists based on the feature quantity data and the predetermined reference feature quantity data.

13. The failure symptom sensing system according to claim 2, wherein the sensing unit determines, when the sensing unit senses the instruction to make the vehicle being in the ignition OFF state, whether a charging state of a battery mounted on the vehicle configured to supply electric power to the failure symptom sensing system satisfies a predetermined charging state, and if the charging state of the battery satisfies the predetermined charging state, the sensing unit is configured to sense whether the indication of failure of the vehicle exists based on the feature quantity data and the predetermined reference feature quantity data.

14. The failure symptom sensing system according to claim 3, wherein the sensing unit determines, when the sensing unit senses the instruction to make the vehicle being in the ignition OFF state, whether a charging state of a battery mounted on the vehicle configured to supply electric power to the failure symptom sensing system satisfies a predetermined charging state, and if the charging state of the battery satisfies the predetermined charging state, the sensing unit is configured to sense whether the indication of failure of the vehicle exists based on the feature quantity data and the predetermined reference feature quantity data.

15. The failure symptom sensing system according to claim 4, wherein the sensing unit determines, when the sensing unit senses the instruction to make the vehicle being in the ignition OFF state, whether a charging state of a battery mounted on the vehicle configured to supply electric power to the failure symptom sensing system satisfies a predetermined charging state, and if the charging state of the battery satisfies the predetermined charging state, the sensing unit is configured to sense whether the indication of failure of the vehicle exists based on the feature quantity data and the predetermined reference feature quantity data.

16. A vehicle configured to move with the failure symptom sensing system according to claim 1 mounted thereon.

17. A vehicle configured to move with the failure symptom sensing system according to claim 2 mounted thereon.

18. A vehicle configured to move with the failure symptom sensing system according to claim 3 mounted thereon.

19. A failure symptom sensing method, comprising:
acquiring, while a vehicle is in an ignition ON state, data from a sensor configured to sense a state of the vehicle;
generating, from the data, feature quantity data indicating a feature quantity of the data; and
sensing, when an instruction to make the vehicle being in the ignition OFF state is sensed, whether an indication of failure of the vehicle exists based on the feature quantity data and a predetermined reference feature quantity data.

20. A computer-readable recording medium having recorded thereon a program to cause a computer to perform operations comprising:
acquiring, while a vehicle is in an ignition ON state, data from a sensor configured to sense a state of the vehicle;
generating, from the data, feature quantity data indicating a feature quantity of the data; and sensing, when an instruction to make the vehicle being in the ignition OFF state is sensed, whether an indication of failure of the vehicle exists based on the feature quantity data and a predetermined reference feature quantity data.

\* \* \* \* \*